(12) United States Patent
Church

(10) Patent No.: US 10,690,110 B2
(45) Date of Patent: Jun. 23, 2020

(54) STRUCTURE WITH RIGID PROJECTIONS ADAPTED TO TRAVERSE A FLUID ENVIRONMENT

(71) Applicant: Ryan Church, Toronto (CA)

(72) Inventor: Ryan Church, Toronto (CA)

( * ) Notice: Subject to any disclaimer, the term of this patent is extended or adjusted under 35 U.S.C. 154(b) by 545 days.

(21) Appl. No.: 15/501,461

(22) PCT Filed: Aug. 5, 2015

(86) PCT No.: PCT/CA2015/050741
§ 371 (c)(1),
(2) Date: Jun. 6, 2017

(87) PCT Pub. No.: WO2016/019468
PCT Pub. Date: Feb. 11, 2016

(65) Prior Publication Data
US 2017/0276117 A1  Sep. 28, 2017

Related U.S. Application Data

(60) Provisional application No. 62/033,331, filed on Aug. 5, 2014.

(51) Int. Cl.
*F03D 1/06* (2006.01)
*B64C 11/18* (2006.01)
(Continued)

(52) U.S. Cl.
CPC ............. *F03D 1/0633* (2013.01); *B63H 1/28* (2013.01); *B64C 11/14* (2013.01); *B64C 11/18* (2013.01);
(Continued)

(58) Field of Classification Search
CPC ............. Y02E 10/721; F05B 2250/183; F05B 2260/96; F05B 2240/30; F03D 1/0633;
(Continued)

(56) References Cited

U.S. PATENT DOCUMENTS 2,472,357 A   6/1949  Wolf
5,533,865 A * 7/1996  Dassen ................ F03D 1/0608
                                                       416/228
(Continued)

FOREIGN PATENT DOCUMENTS

CA    2893408 A1   6/2014
CN    102465827 A  5/2012
(Continued)

OTHER PUBLICATIONS

SIPO, Office Action for Chinese Application No. 201580042055.1 dated Jul. 26, 2018.
(Continued)

*Primary Examiner* — Hai H Huynh
*Assistant Examiner* — Gonzalo Laguarda
(74) *Attorney, Agent, or Firm* — Norton Rose Fulbright Canada LLP

(57) ABSTRACT

A structure adapted to traverse a fluid environment includes an elongate body having a root, a wingtip, a leading edge and a trailing edge; and a plurality of rigid projections each extending from a respective position along the leading edge and/or the trailing edge generally along the same plane as a front surface of the body.

17 Claims, 9 Drawing Sheets

(51) Int. Cl.
*B63H 1/28* (2006.01)
*B64C 11/14* (2006.01)
*F15D 1/12* (2006.01)
*B64C 23/06* (2006.01)

(52) U.S. Cl.
CPC .......... *B64C 23/072* (2017.05); *F03D 1/0608* (2013.01); *F03D 1/0625* (2013.01); *F03D 1/0666* (2013.01); *F03D 1/0675* (2013.01); *F03D 1/0691* (2013.01); *F15D 1/12* (2013.01); *F05B 2240/133* (2013.01); *F05B 2240/221* (2013.01); *F05B 2240/30* (2013.01); *F05B 2250/15* (2013.01); *F05B 2250/16* (2013.01); *F05B 2250/183* (2013.01); *F05B 2250/25* (2013.01); *F05B 2250/611* (2013.01); *F05B 2260/30* (2013.01); *F05B 2260/96* (2013.01); *Y02E 10/721* (2013.01); *Y02T 50/164* (2013.01)

(58) Field of Classification Search
CPC .... F03D 1/0608; F03D 1/0625; F03D 1/0666; F03D 1/0675; F03D 1/0691; B64C 23/072; B64C 11/14; B64C 11/18; B63H 1/28; F15D 1/12
USPC ....................... 415/118, 119; 416/61, 94, 500
See application file for complete search history.

(56) References Cited

U.S. PATENT DOCUMENTS

| | | | |
|---|---|---|---|
| 6,830,436 B2 * | 12/2004 | Shibata | F03D 1/0641 416/228 |
| 7,931,444 B2 | 4/2011 | Godsk et al. | |
| 8,414,261 B2 * | 4/2013 | Bonnet | F03D 1/0641 415/119 |
| 8,460,779 B2 * | 6/2013 | Gupta | B64C 21/10 428/156 |
| 9,341,158 B2 * | 5/2016 | Smith | F03D 1/0633 |
| 10,259,574 B2 * | 4/2019 | Beckman | B64C 39/024 |
| 2003/0175121 A1 * | 9/2003 | Shibata | F03D 1/0641 416/131 |
| 2008/0061192 A1 | 3/2008 | Sullivan | |
| 2008/0166241 A1 | 7/2008 | Herr et al. | |
| 2010/0008780 A1 | 1/2010 | Miocevich | |
| 2011/0142635 A1 | 6/2011 | Fritz | |
| 2011/0142642 A1 | 6/2011 | McGrath et al. | |
| 2011/0223034 A1 | 9/2011 | Gerber et al. | |
| 2011/0311363 A1 | 12/2011 | Bills et al. | |
| 2012/0051916 A1 | 3/2012 | Bagepalli et al. | |
| 2013/0164488 A1 | 6/2013 | Wood | |
| 2013/0170999 A1 | 7/2013 | Vassilicos | |
| 2015/0233345 A1 * | 8/2015 | Olsen | F03D 1/0633 416/146 R |

FOREIGN PATENT DOCUMENTS

| | | |
|---|---|---|
| CN | 102808725 A | 12/2012 |
| CN | 103124854 A | 5/2013 |
| CN | 103670909 A | 3/2014 |
| CN | 204024906 | 12/2014 |
| DK | 200701852 A | 7/2008 |
| EP | 0652367 A1 | 5/1995 |
| EP | 2592265 A2 | 5/2013 |
| TW | 201210895 | 3/2012 |
| WO | WO02002935 A1 | 1/2002 |
| WO | WO2009018666 A1 | 2/2009 |
| WO | 2013083130 A1 | 6/2013 |
| WO | 2014044414 A1 | 3/2014 |
| WO | 2014207015 A1 | 12/2014 |
| WO | WO2015067387 A1 | 5/2015 |

OTHER PUBLICATIONS

Extended European Search Report dated Mar. 28, 2018, issued in European Application No. 15830094.7.

* cited by examiner

STRUCTURE WITH RIGID PROJECTIONS ADAPTED TO TRAVERSE A FLUID ENVIRONMENT

CROSS-REFERENCE TO RELATED APPLICATION

This application claims priority under 35 U.S.C. 119(e) from U.S. Provisional Patent Application Ser. No. 62/033,331 filed on Aug. 5, 2014, the contents of which are incorporated in their entirety by reference herein.

FIELD OF THE INVENTION

The present invention relates generally to structures adapted to traverse fluid environments, and more particularly to a structure adapted to traverse fluid environments having an elongate body and rigid projections.

BACKGROUND OF THE INVENTION

Horizontal-axis wind turbines for generating electricity from rotational motion are generally comprised of one or more rotor blades each having an aerodynamic body extending outwards from a horizontal shaft that is supported by, and rotates within, a wind turbine nacelle. The nacelle is supported on a tower which extends from the ground or other surface. Wind incident on the rotor blades applies pressure causing the rotor blades to move by rotating the shaft from which they extend about the horizontal rotational axis of the shaft. The shaft is, in turn, associated with an electricity generator which, as is well-known, converts the rotational motion of the shaft into electrical current for transmission, storage and/or immediate use. Horizontal-axis wind turbines are generally very well-known and understood, though improvements in their operation to improve the efficiency of power conversion and their overall operational characteristics are desirable.

Incident wind at even low speeds can cause the rotor blades to rotate very quickly. As would be well-understood, for a given rotational velocity, the linear velocity of a rotor blade is lowest in the region of its root—the portion of the rotor blade proximate to the shaft. Similarly, the linear velocity of the rotor blade is highest in the region of its wingtip—the portion of the rotor blade distal from the shaft. Particularly at higher linear velocities, aspects of the rotor blade can generate significant aeroacoustic noise as the rotor blade rapidly "slices" through air along its rotational path. This noise can be quite uncomfortable for people and animals in the vicinity to witness. However, the noise can also be an indicator that operation is not efficient, and maximum wingtip speed can actually be limited by such inefficiencies.

Wind turbines are increasing in popularity in recent years as a means of generating renewable energy. With this growth, optimal locations for their operation have been subsequently declining, with these locations being limited. As a result, wind turbines have been placed closer and closer to communities, accordingly placing the noise that the wind turbines generate closer to people who can hear it. Complaints and resistance from neighbours of wind turbine developments can mount, particularly in respect of complaints of "hissing" or "swishing" sounds in the 1 kHz frequency range. Only recently has noise emissions become a concern for rotor blade designers, who must balance many a criterion to produce the optimal rotor blade. However, since noise is a form of energy, decreasing noise emissions may also have a positive benefit to energy production, since energy will not be lost in the production of sound waves.

Noise emissions from the rotor blade either come from the tips, called tip vortex noise, or from the trailing edge near, but not at, the tip. Rotor blade noise has been found to mostly consist of trailing edge noise, and comes in two varieties—blunt trailing edge noise, or "B-TE" noise, and turbulent boundary layer trailing edge noise, or "TBL-TE" noise, with TBL-TE being the largest cause for rotor blade noise emissions. TBL-TE is caused by scattering of turbulent fluctuations within the blade boundary layer at the trailing edge, resulting in radiation of broad-frequency noise. It would be useful to enhance the structure of a rotor blade in an attempt to reduce TBL-TE rotor blade noise emissions.

Straight serrations that follow the blade suction-side contour near the trailing edge have been explored as a means for reducing the scattering of turbulent fluctuations within the blade boundary layer at the trailing edge and have been shown to reduce the total sound pressure level by 2 dB, dominated by reductions in noise at relatively low frequencies. U.S. Patent Application Publication No. 2008/0166241 to Herr et al. discloses a means of reducing the noise emissions of a rotor blade during use by employing bristles at the trailing edge of a rotor blade. According to the inventors, for reducing trailing edge related noise, shorter bristles achieve better reduction results for lower frequencies, whereas longer bristles tend to be more effective for higher frequencies. The inventors explain that a combination of bristles with significantly different outer dimensions in the same region of the blade contributes to a reduction characteristic with a higher efficiency in a broad frequency spectrum.

The radiated noise from a rotor blade is loudest for an incident pressure wave that is aligned with the edge of the rotor blade and traveling normal to that edge. As the pressure wave passes over the edge, it encounters a sudden change in acoustic impedance, resulting in the scattering of noise. The bristles can be viewed as a means of distributing this sudden change in impedance over a finite distance, thereby reducing the strength of the scattering process. However, the straight serrations also resulted in a significant increase in noise at high frequencies (>2000 Hz). Thus, one skilled in the art would recognize that the use of straight serrations requires careful placement and a careful consideration of widths and lengths in order to achieve a desired effect. In addition, turbulent inflow noise may contribute to the noise spectrum of a wind turbine at low frequencies. Thus, one skilled in the art must manage both the incoming and the out going air flows in order to achieve a desired effect.

SUMMARY OF THE INVENTION

According to an aspect, there is provided a structure adapted to traverse a fluid environment, the structure comprising an elongate body having a root, a wingtip, a leading edge and a trailing edge; and a plurality of rigid projections each extending from a respective position along the leading edge and/or the trailing edge generally along the same plane as a front surface of the body.

In an embodiment, the elongate body is a rotor blade for a wind turbine. The structures described herein are provided with a view to reducing scattering of turbulent fluctuations within the boundary layer at the trailing edge of the rotor blade. As a result, rotor blade projections for a wind turbine are provided which decrease the noise emissions and/or increase the efficiency of the wind turbine as a whole through their application and use.

According to embodiments, structures are provided that create a sound wave at a particular location so that it may destructively interfere with another sound wave. In embodiments, this is done by providing structures having rigid projections of multiple varying lengths and widths that correspond to specific qualities of the noise emissions from the rotor blades that are desired to be reduced.

According to an embodiment of the present patent application, wherein the structure is a rotor blade for a wind turbine, projections may be mounted onto the leading edge and/or trailing edge of a rotor blade(s).

According to an aspect, the rotor blade projections are applied in the range of 40-96% of the rotor blade, where the root of the rotor blade represents 0% and the blade tip represents 100%.

According to another aspect, the rotor blade projections may alternate in length and width and be non-uniform in dispersement.

According to yet another aspect, the rotor blade projections generally decrease in length and width moving towards the blade tip.

According to still another aspect, the rotor blade projections alternate their pattern of length and width, which is determined specifically from the characteristics of the sound waves desired to be reduced.

According to still yet another aspect, the rotor blade projections may be composed of biologically or non-biologically based materials.

According to still yet another aspect, the length of the rotor blade projections is approximately parallel to a local flow streamline defined for that projection.

According to still yet another aspect, the rotor blade projections may be made of a material with a coefficient of linear thermal expansion (CLTE) between $1.0 \times 10^{-4}$ m/m ° C. and $7.0 \times 10^{-4}$ m/m ° C.

According to another embodiment of this invention, the rotor blade projections may be flexible or rigid and/or have a curvilinear or linear architecture.

According to an aspect, the curvilinear rotor blade projections may be in the line of the arc of local flow streamline defined for that projection.

According to another embodiment of this invention, the rotor blade projections may have a different configuration on the trailing edge as opposed to the leading edge.

According to an aspect, the rotor blade projections on the leading edge may have a larger surface area as compared to the trailing edge.

According to another aspect, the rotor blade projections may be applied in the region of the trailing edge only.

According to yet another aspect, the rotor blade projections may be applied in the region of the leading edge only.

According to another embodiment of this invention, the rotor blade projections and the aerodynamic body of the rotor blade may be a unitary structure.

According to an aspect, the rotor blade projections and the aerodynamic body of the rotor blade may be two (2) or more pieces connected to each other.

According to an embodiment of this invention, the rotor blade projections may be a serration, brush, comb, riblet, fluting or fimbriae or the like.

According to another embodiment of this invention, the rotor blade projections may be made from a fibrous material that is embedded within a matrix, and may come from a biological or non-biological feed stock.

According to an aspect, rotor blade projections composed of biologically based material may have fibres that may include collagen, elastin, fibronectin, laminin, α-chitin, β-chitin, α-keratin, β-keratin, keratosulfate, cellulose, perlecan, agrin, mesoglea, keratin fibre soybean (KFS), chicken feather fibre (CFF) and/or polysaccharides, and exists within a matrix that may include acrylate epoxidized soybean oil (AESO) resin, polysaccharide-gels, water, glycosaminoglycans (GAGs) and/or proteoglycans.

According to an aspect, rotor blade projections composed of biologically based material may have a higher percentage of elastin-type fibres than collagen-type fibres and/or a higher percentage of matrix than fibres.

According to another aspect, rotor blade projections composed of non-biologically based material may have fibres that may include glass-fibres, plastic-fibres, and/or carbon-fibres, and exists with in a matrix that may include silicone, epoxy resin, and/or polyester resin.

According to another aspect, rotor blade projections composed of non-biologically based material may have a higher percentage of matrix than fibres.

According to another embodiment, a method for increasing the efficiency and/or decreasing the noise emissions of an operating wind turbine comprising a hub and rotor blade(s), wherein at least one rotor blade is connected to the hub and is defined by an aerodynamic body having a pressure side, suction side, leading edge, trailing edge and blade tip is given, the method comprising: mounting a plurality of projections inspired by the wing of an owl on the aerodynamic body that extend in the vicinity of the leading and/or trailing edge, applying these projections in the range of 40-96% of the rotor blade, where the root of the rotor blade represents 0% and the blade tip represents 100% and alternating the length and width respective to these projections.

According to an aspect, a method for increasing the efficiency and/or decreasing the noise emissions of an operating wind turbine is achieved by having the length of the longer projection on the rotor blade longer by ½ the sound wavelength produced by the shorter neighbouring projection at a given temperature.

According to an aspect, a method for increasing the efficiency and/or decreasing the noise emissions of an operating wind turbine is achieved by eliciting destructive interference of the sound waves through the active creation of a sound wave of a certain wavelength that corresponds with a neighbouring sound wave emitted by any component of the rotor blade.

According to another embodiment of this invention, a method of manufacturing these rotor blade projections is given, whereby they may be made from a fibrous material embedded within a matrix.

According to an aspect, a method of manufacturing these rotor blade projections is given, wherein the fibrous material is biologically-based, and may include collagen, elastin, fibronectin, laminin, α-chitin, β-chitin, α-keratin, β-keratin, keratosulfate, cellulose, perlecan, agrin, mesoglea, keratin fibre soybean (KFS), chicken feather fibre (CFF) and/or polysaccharides, and exists within a matrix that may include acrylate epoxidized soybean oil (AESO) resin, polysaccharide-gels, water, glycosaminoglycans (GAGs) and/or proteoglycans.

According to another aspect, a method of manufacturing these rotor blade projections is given, wherein the fibrous material is biologically-based, and contains a higher percentage of elastin-type fibres than collagen-type fibres and/or a higher percentage of matrix than fibres.

According to another aspect, a method of manufacturing these rotor blade projections is given, wherein the fibrous material is not biologically based, and may include glass-fibres, plastic-fibres, and/or carbon-fibres, and exists within a matrix that may include silicone, epoxy resin, and/or polyester resin.

According to another aspect, a method of manufacturing these rotor blade projections is given, wherein the fibrous material is not biologically based, and contains a higher percentage of matrix than fibres.

According to another embodiment of this invention, a method of manufacturing these rotor blade projections is given, wherein these projections may be printed through the use of a 3D printer, and more specifically a multi-material 3D printer.

According to another aspect, a method of manufacturing these rotor blade projections is given, wherein the method may include pre-impregnated technology, pultrusion, automated fibre placement (AFP), and/or injection moulding.

According to another embodiment of this invention, any method of application of the rotor blade projections to the aerodynamic rotor blade body may be carried out, and may be applied to an existing wind turbine and/or a wind turbine during its manufacture.

According to a final embodiment, the invention can be applied to an arbitrary airfoil, not depending on the aerodynamic design thereof.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

The present patent application includes description of opportunities for improving on the traditional aspects of a blade configuration for a wind turbine. The present patent application yields to a blade configuration with unique biologically-inspired projections that can conveniently be retrofitted onto the blade portion as desired, and which create destructive interference so that the emitted sound waves are decreased, thus increasing the overall efficiency of the wind turbine.

Figure 1:
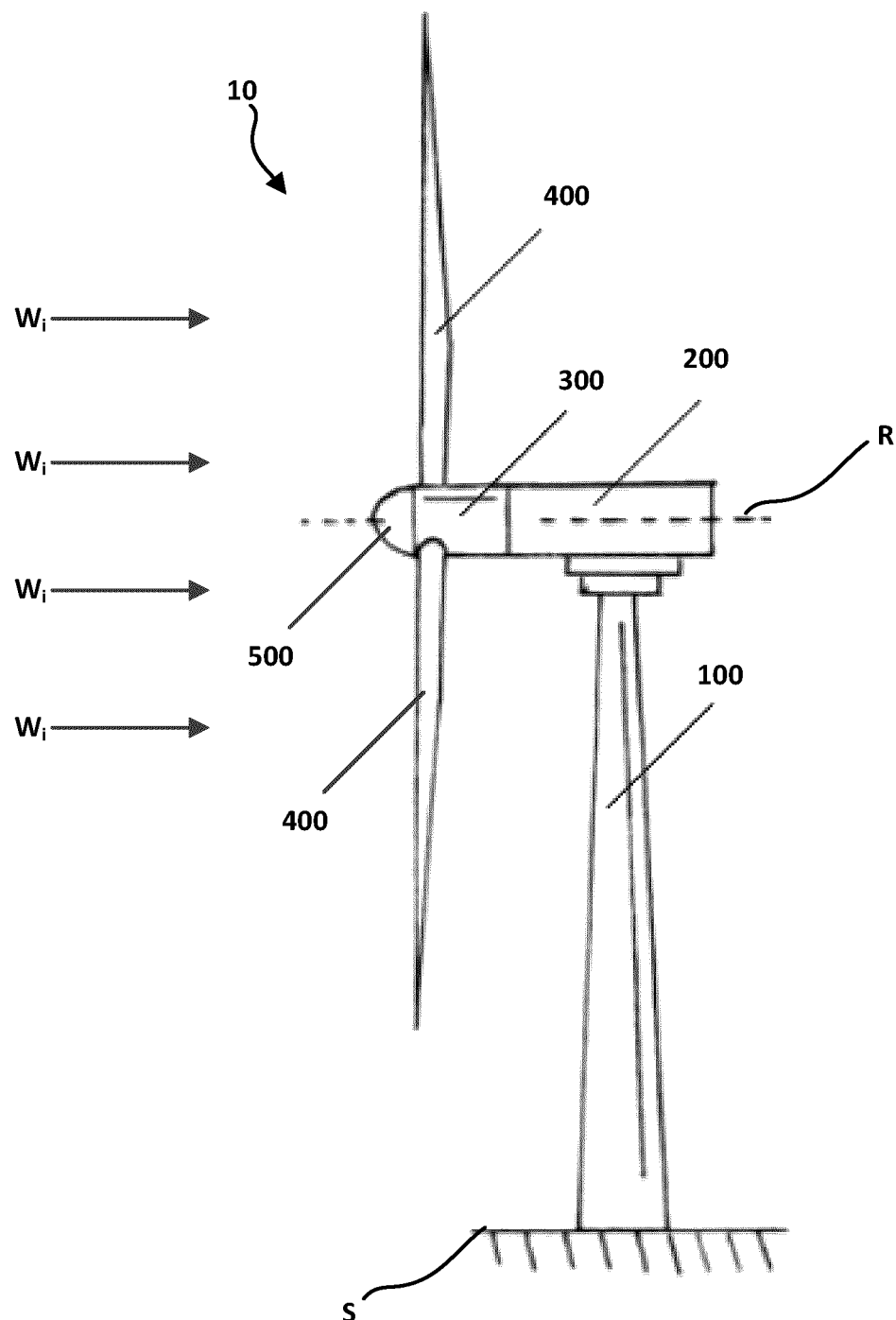
FIG. 1 is a side elevation view of a horizontal axis wind turbine, according to the prior art.

FIG. 1 is a side elevation view of a horizontal axis wind turbine 10, according to the prior art. Wind turbine 10 includes a tower 100 supported by and extending from a surface S, such as a ground surface. Supported by tower 100, in turn, is a nacelle 200 extending horizontally. A hub with a spinner 300 is rotatably mounted at a front end of nacelle 200 and is rotatable with respect to nacelle 200 about a rotation axis R. Spinner 300 receives and supports multiple rotor blades 400 that each extend outwardly from spinner 300. Rotor blades 400 catch incident wind W, flowing towards the wind turbine 10 and are caused to rotate. Due to their being supported by spinner 300, rotor blades 400 when rotating cause spinner 300 to rotate about rotation axis R thereby to cause rotational motion that can be converted in a well-known manner into usable electrical or mechanical power. In this sense, rotor blades 400 are each structures adapted to traverse a fluid environment, where the fluid in this embodiment is ambient air. Nacelle 200 may be rotatably mounted to tower 100 such that nacelle 200 can rotate about a substantially vertical axis (not shown) with respect to tower 100, thereby to enable rotor blades 400 to adaptively face the direction from which incident wind W, is approaching wind turbine 10. A nose cone 500 of generally a uniform paraboloidal shape is shown mounted to a front end of spinner 300 to deflect incident wind W, away from spinner 300.

Figure 2:
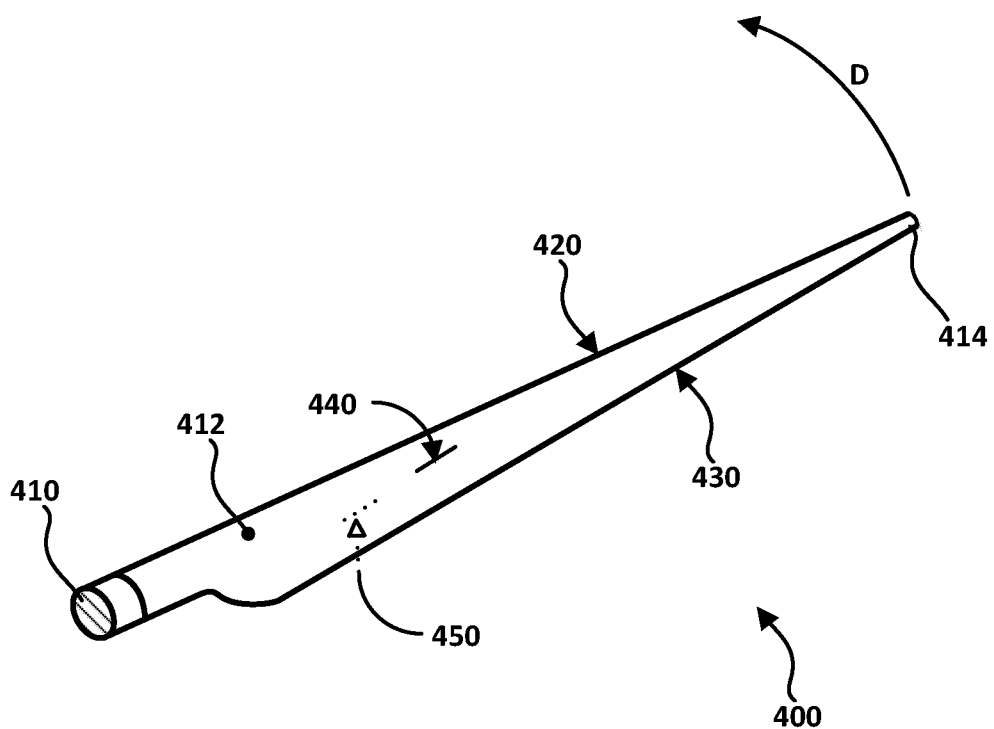
FIG. 2 is a front perspective view of one of the rotor blades of the wind turbine of FIG. 1, in isolation.

FIG. 2 is a front perspective view of one of rotor blades 400 in isolation. Rotor blade 400 includes an elongate body that extends from a root 410 through a main section 412 to terminate at a wingtip 414. Root 410 extends from nacelle 200 when attached thereto or integrated therewith, whereas wingtip 414 is the portion of the elongate body that is distal to nacelle 200. The elongate body has a leading edge 420 and a trailing edge 430, where leading edge 420 leads trailing edge 430 when rotor blade 400 is in motion rotating with nacelle 200 about rotation axis R in the direction D. A suction side 440 of the elongate body is shown in FIG. 2, and a pressure side 450, shown in dotted lines, is opposite the elongate body from suction side 440.

Figure 3:
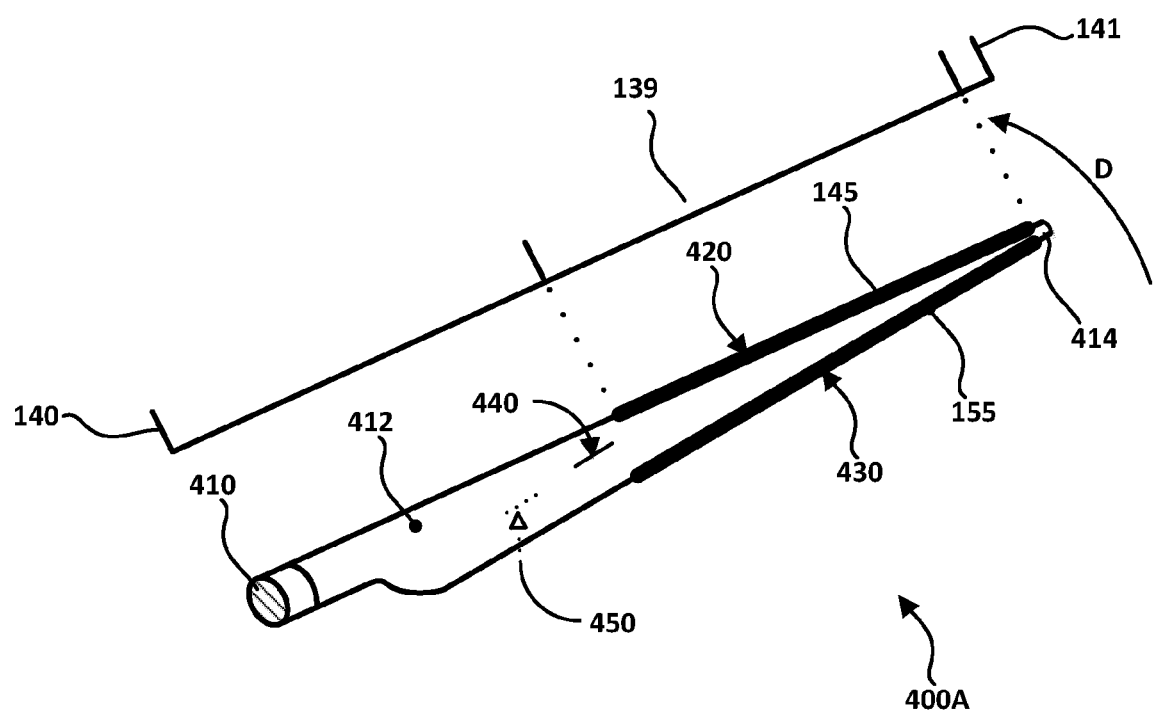
FIG. 3 is a front perspective view of a structure in accordance with an embodiment of the invention, in isolation.

FIG. 3 is a front perspective view of a structure 400A in accordance with an embodiment of the invention, in isolation. A detailed perspective view of the structure 400A defines an aerodynamic body having a pressure side 440, a suction side 450, a leading edge 420, a trailing edge 430 and wingtip 414, the blade body further comprising an application in the range of 40-96% 139 of the rotor blade, where the root of the rotor blade represents 0% 140 and the blade tip represents 100% 141. Two regions outlined at the leading edge 145 and trailing edge 150 show the possible areas of attachment for the projections.

Figure 4:
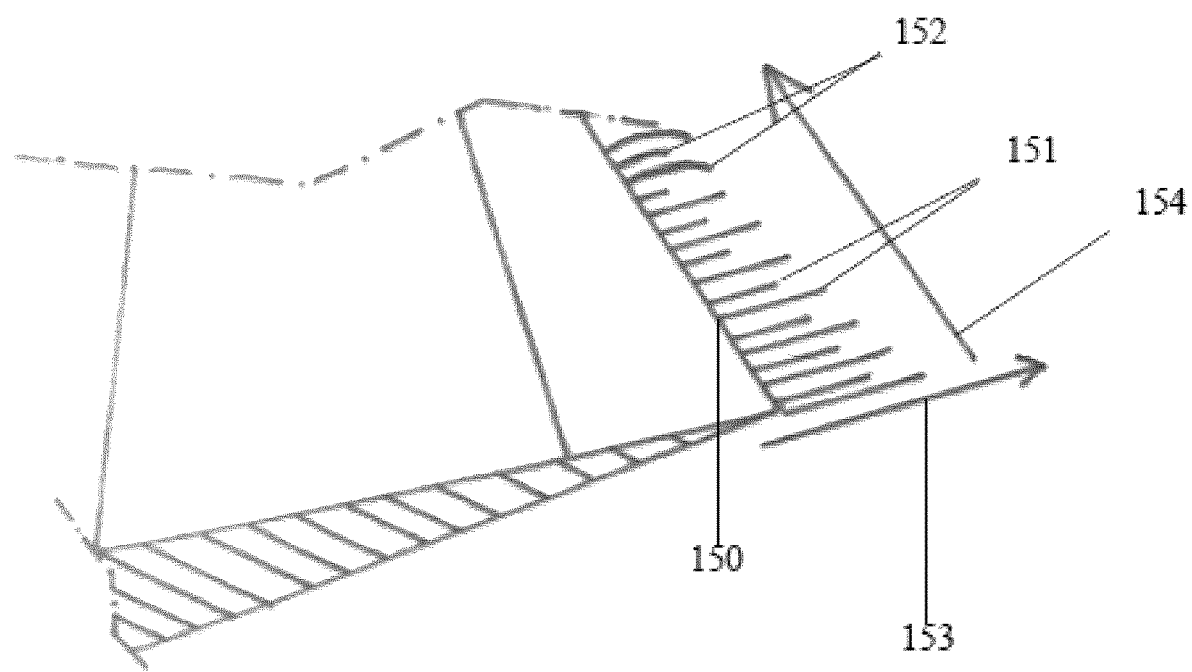
FIG. 4 is a perspective cross-sectional view of the trailing edge of a structure having various trailing edge projections.

FIG. 4 illustrates a perspective cut-away view of the trailing edge 150 of a wind turbine rotor blade showing various flexible or rigid projections of linear 151 or curvilinear 152 architecture as example. The curvilinear projections 152 are in the line of the arc of local flow streamline defined for that projection and the length of each of the plurality of projections is approximately parallel to a local flow streamline defined for that projection. The local flow streamline 153 is shown respective to the linear projection 151. The projections may be referred to as a comb, brush, serration, riblet, fluting or fimbriae and may be applied through a variety of methods. The projections have a generally decreasing length and width moving towards the blade tip 154.

Figure 5A:
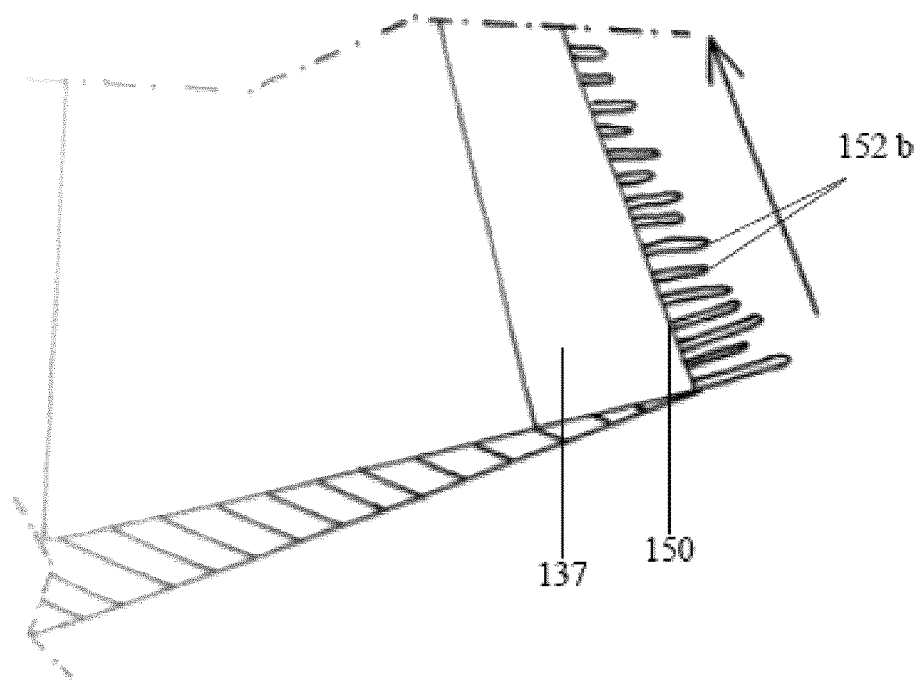
FIG. 5A is a perspective cross-sectional view of the trailing edge of a structure having various trailing edge projections.

FIG. 5A illustrates other perspective cut-away view of the trailing edge 150 of a wind turbine rotor blade showing various projections 152b that are of a larger surface area than those of FIG. 4. The projections 152b may be integrally formed with the body of the blade at the trailing edge 137 during manufacture such that the projections 152b and the body of the trailing edge 137 are a unitary structure, or may alternatively be elements applied after formation of the blade body 137 to improve the operation of the wind turbine. In such an alternative construction, it is important that the flow of wind along the front surface of the blade be interrupted as little as possible due to the seams/discontinuities between the projections 152b and the body of the blade 137 at the point 150.

Figure 5B:
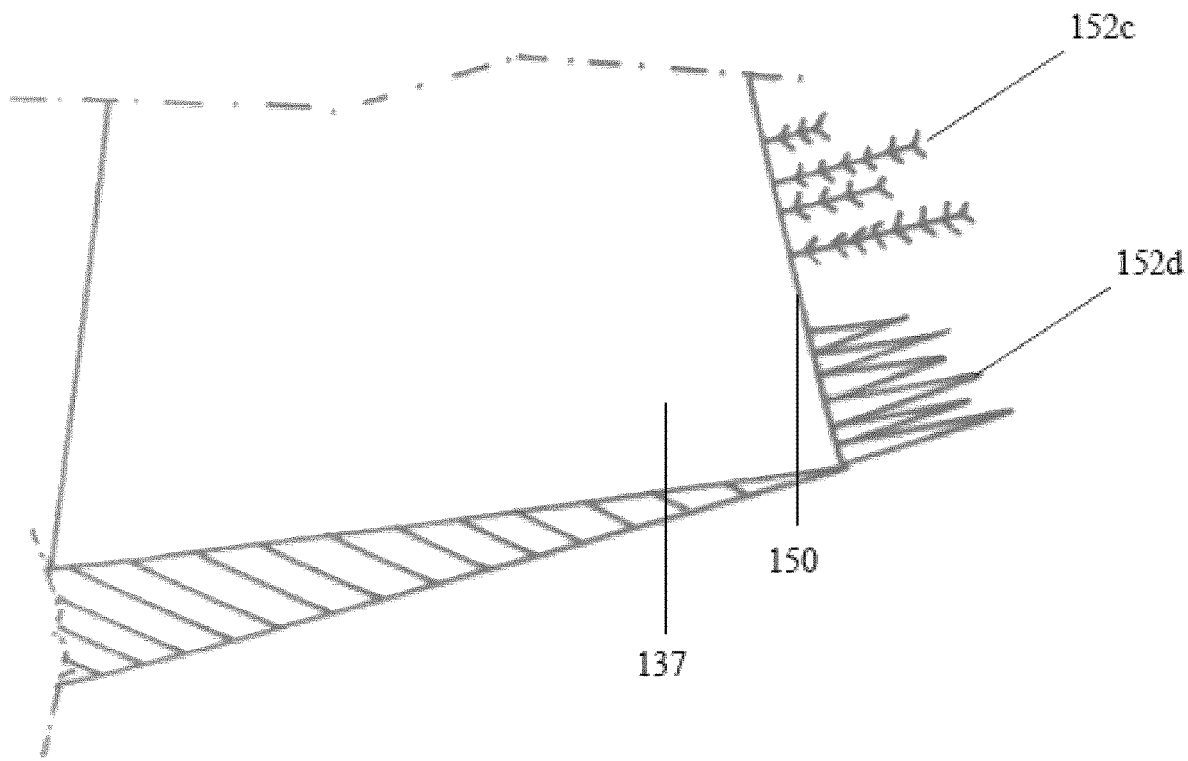
FIG. 5B is a perspective cross-sectional view of the trailing edge of a structure having various trailing edge projections.

FIG. 5B illustrates yet another perspective cut-away view of the trailing edge 150 of a wind turbine rotor blade showing various example projections, such as the brush 152c and serration 152d attached to the blade body 137. The brush 152c may preferentially resemble the plurality of projections extending from the trailing edge of the owl's wing. These projections are a tattered assembly of feathers of various lengths and sizes. The projections extending from the trailing edge of the blade may individually be of any length in relation to their diameter, and may be any thickness in relation to their length, such that the resulting action is beneficial to a decrease in noise emissions and/or an increase in efficiency for the wind turbine unit as a whole.

Figure 6:
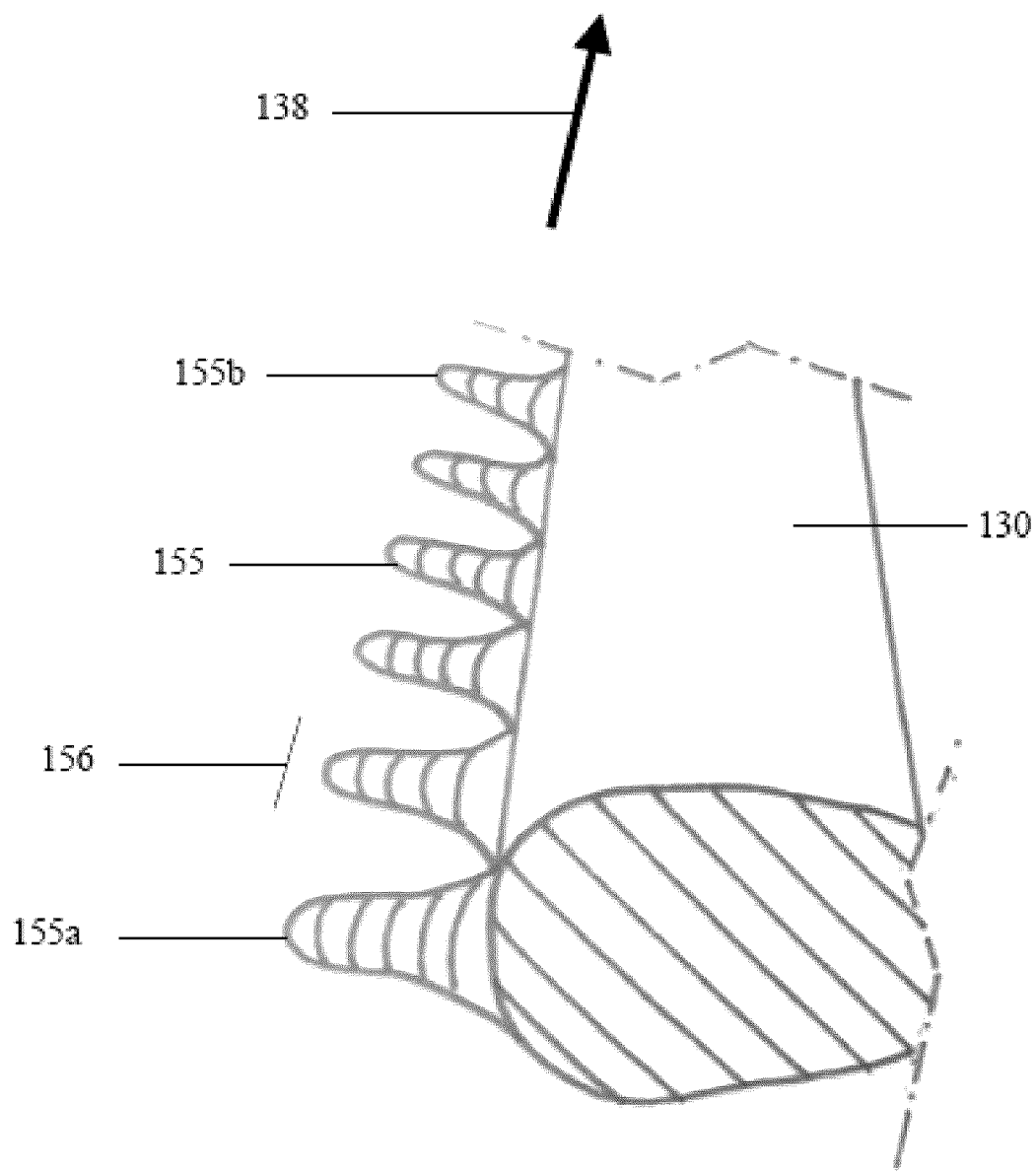
FIG. 6 is a perspective cross-sectional view of the trailing edge of a structure having various leading edge projections.

FIG. 6 illustrates a perspective cut-away view of the leading edge 145 of a wind turbine rotor blade 130 showing various projections 155. These projections serve to break up the turbulence in the wind incident on the leading edge 145 into smaller groupings of micro-turbulences, thereby reducing the overall amount of noise emissions of the wind turbine, and increasing the efficiency of the wind turbine as a whole. The projections extending from the leading edge of the blade must be tapered, and must be spaced by at least their respective diameter and/or width 156, such that the resulting action is beneficial to a decrease in noise emissions and/or an increase in efficiency for the wind turbine unit as a whole. The projections 155 on the leading edge are different to the projections on the trailing edge, and may be larger as compared to those of FIG. 5, and may be applied to just the trailing edge only, or just the leading edge only. The projections 155 decrease in surface area towards the region of the wing tip 138, such that the projection 155a is larger than 155b. As can be seen in these projections, they may have a bulbous nature to them.

Figure 7:
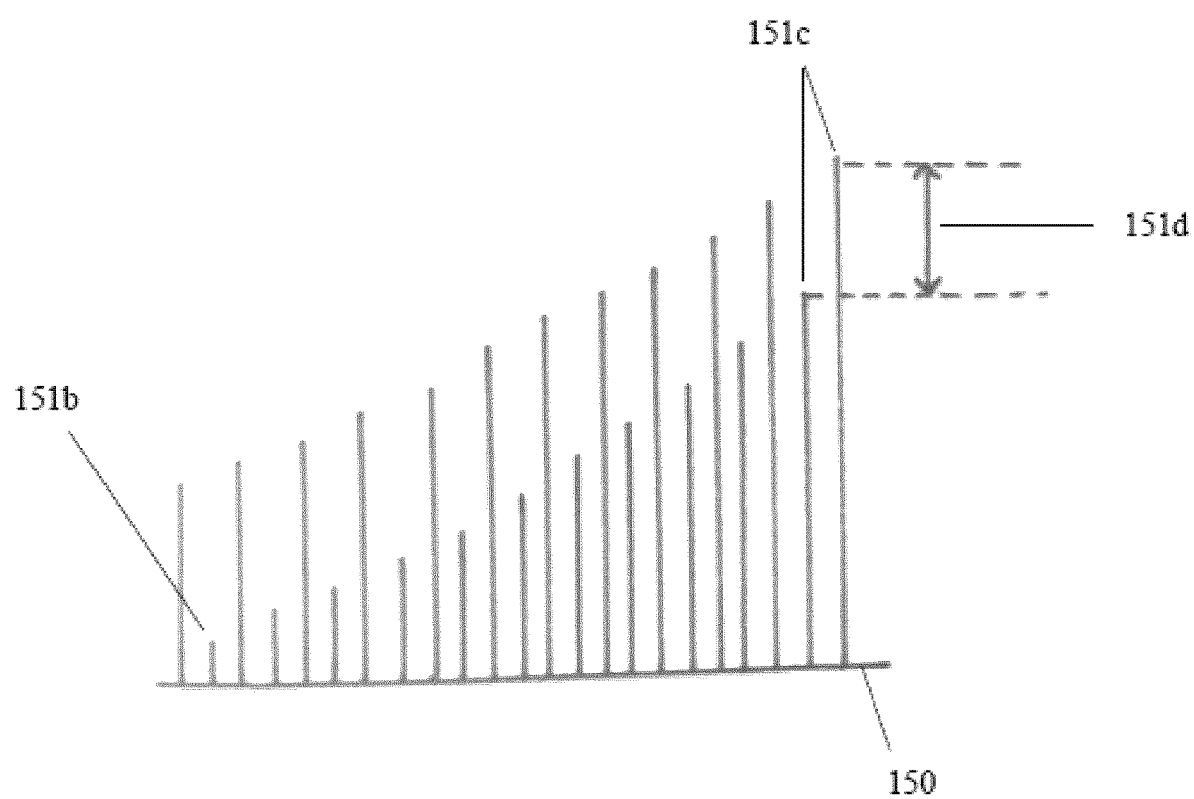
FIG. 7 illustrates a top plan view of the trailing edge of a structure showing various projections and their respective lengths.

The technical reasons for varying the lengths of neighbouring projections by various amounts are below explained with reference to FIGS. 7 through 9. These distances are based on the wavelengths of the sound waves produced at varying regions of the rotor blade, which is in turn based upon the velocity of the fluid at that point. FIG. 7 illustrates a top-down view of the trailing edge 150 of a wind turbine rotor blade showing various projections 151b and their respective lengths. These trailing edge projections alternate in length and width and are non-uniform in dispersement, as can be seen in the projections at 151b through to 151c. The difference in length 151d of neighbouring projections is based on the wavelength distance of the sound wave to be minimized.

Figure 8:
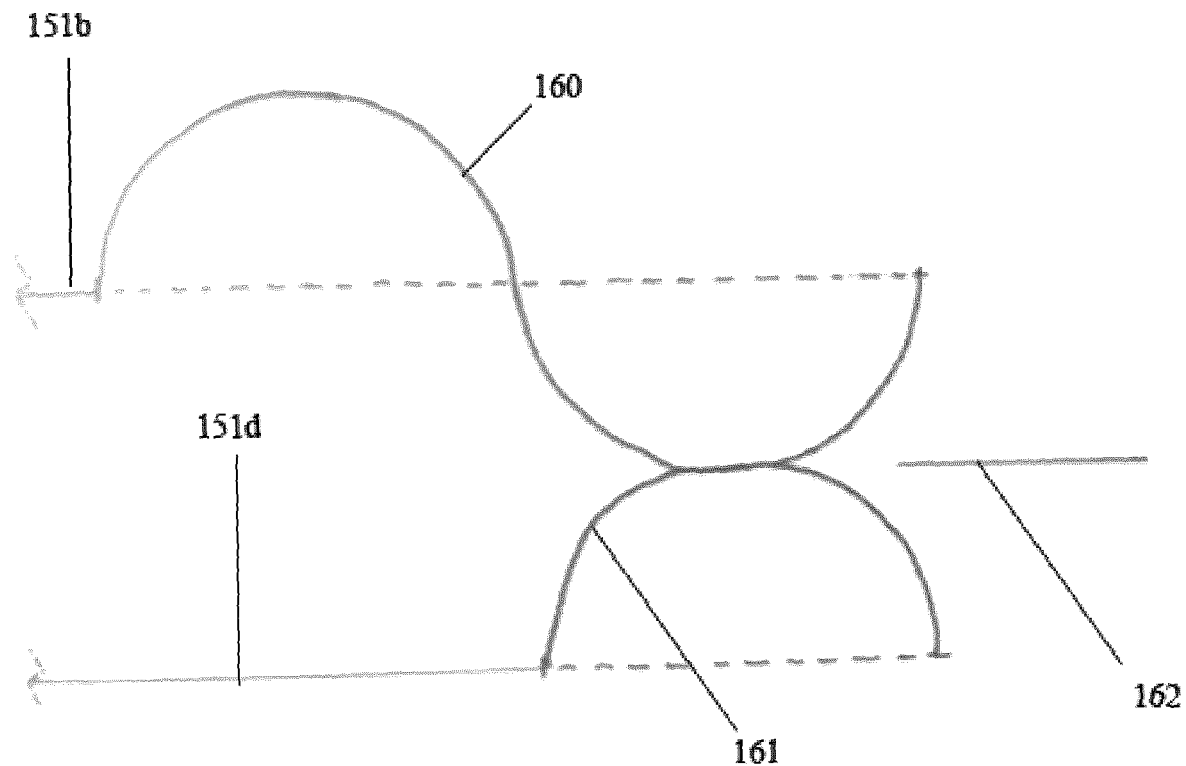
FIG. 8 illustrates a side elevation view of a sound wave emitted from a trailing edge projection of a structure, including destructive interference of the sound wave.
Figure 9:
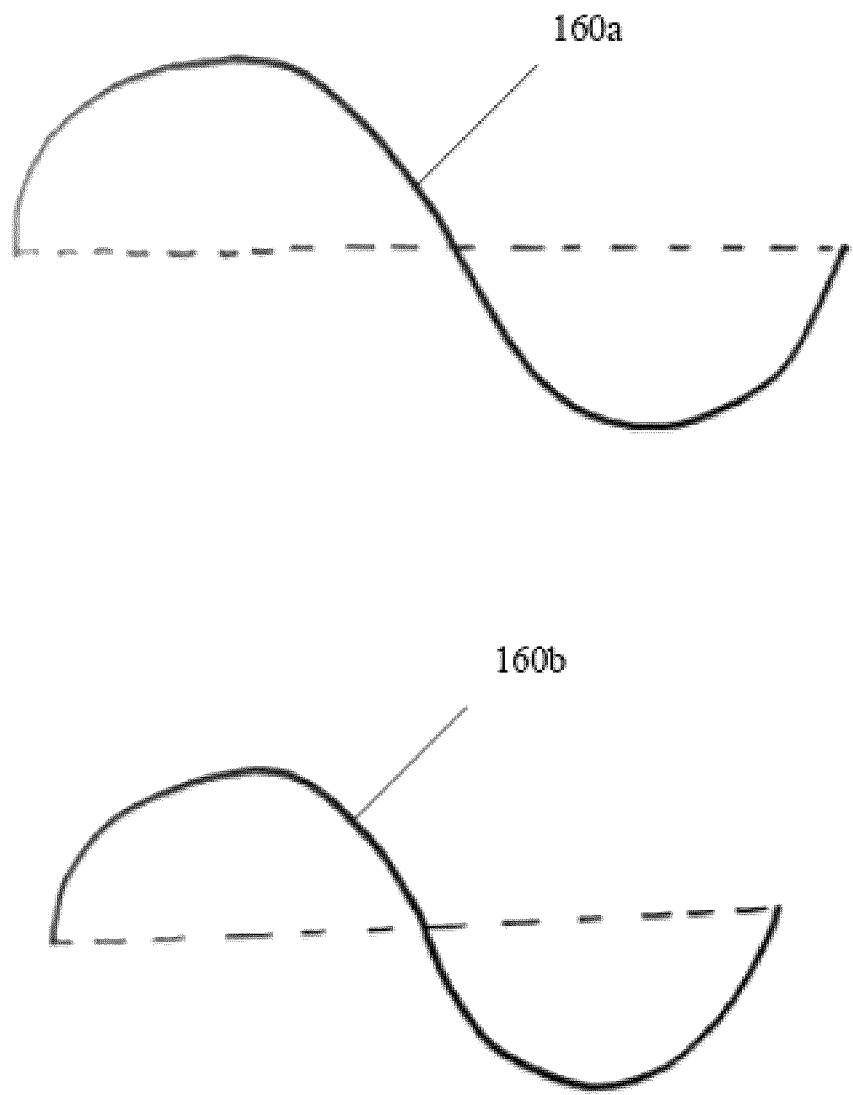
FIG. 9 illustrates two side elevation views of respective sound waves of varying frequency within the range of those emitted from a trailing edge of a structure such as a wind turbine rotor blade.

FIG. 8 illustrates the further reasoning of this distance, which is ½ the wavelength of the sound wave to be minimized Here, you can see a side-on view of a sound wave 160 emitted from a trailing edge projection 151b of a wind turbine rotor blade of this invention, showing a method of destructive interference of the sound wave. According to an embodiment of this invention, the non-uniform lengths 151b, 151d are based upon the sound waves 160, 161 emanating from the various projections during the operation of the wind turbine.

FIG. 8 further illustrates destructive interference, and the resulting sound wave 162 when this phenomenon occurs. FIG. 9 also illustrates a side-on view of two sound waves 160a, 160b of varying frequencies within the range of those emitted from the trailing edge of an operational wind turbine rotor blade. The wavelengths of the sound waves emitted decreases at you approach the blade tip, and thus varying lengths of projections are required. Here, this is illustrated in that wavelength 160a is longer than 160b, and would thus be emitted closer to the tip. These projections may be composed of biological or non-biologically based materials, where they are made of a materials with a coefficient of linear thermal expansion (CLTE) between $1.0 \times 10^{-4}$ m/m °C. and $7.0 \times 10^{-4}$ m/m °C., and more preferably $5.87 \times 10^{-4}$ m/m °C. This material may be made from a fibrous material that is embedded within a matrix. Where the fibrous material is biologically-based, it may include collagen, elastin, fibronectin, laminin, α-chitin, β-chitin, α-keratin, β-keratin, keratosulfate, cellulose, perlecan, agrin, mesoglea, keratin fibre soybean (KFS), chicken feather fibre (CFF) and/or polysaccharides, and exist in a matrix that may include acrylate epoxidized soybean oil (AESO) resin, polysaccharide-gels, water, glycosaminoglycans (GAGs) and/or proteoglycans. Where the fibrous material is not biologically-based, and may include glass-fibres, plastic-fibres, and/or carbon-fibres, and exists in a matrix that may include silicone, epoxy resin, and/or polyester resin. Further, where the fibres are biologically based, there may be a higher percentage of elastin-type fibres than collagen-type fibres and/or a higher percentage of matrix than fibres. Where the fibres are non-biologically based, there may be a higher percentage of matrix than fibres.

Theoretical Considerations:

The wavelength (w) of a given sound wave changes to a greater degree with temperature and to a lesser degree with elevation. Sound waves emitted and received below 5000 feet can be considered to be standard, and since most commercial wind farms are below this elevation, the present considerations will consider elevation to be of trivial importance with respect to the wavelength of sound. Temperature, however, has a greater effect on the wavelength of sound, and is represented in the graph below. The wavelength (w) of a given sound wave is determined by the product of the velocity (v) of the wave (which is dependent upon the temperature of the air) divided by the frequency (f), as in Equation 1 below:

$$w = v/f \qquad (1)$$

Thus, with the speed of sound being about 340.276 meters per second (m/s) at 15° C. and below an altitude of 5000 feet, the wavelength of a sound wave of 1000 Hertz (Hz) is about 34 centimetres (cm), as shown in Equation 2 below:

$$w = 340.276 \text{ m/s}/1000 \text{ hz} = 34.028 \text{ cm} \qquad (2)$$

Sound emitted from wind turbine rotor blades varies with respect to the position of the airfoil that the flow streamline is passing over, respective to the axis of rotation, with areas further from this axis experiencing higher frequencies with higher local flow speeds. This scaling relationship increases by the fifth power ($U^5$) of fluid velocity to noise intensity. Frequencies in and around 1 Khz have been described by listeners as sounding like a 'swooshing' noise, with 2 Khz sounding like a 'humming' noise and 20 Khz (the limit of human hearing) sounding like an ear-piercing 'ringing' noise. Frequencies emitted by wind turbine rotor blades that generally fall into the frequency range of 1-20 Khz are the primary focus of this invention. As shown in Table 1 below, we can also see that the change wavelength increases on the order of forty (40) micrometers (μm). The average change in wavelength with respect to temperature was determined to be 0.0587 cm. Therefore, an ideal material for this application would have a coefficient of linear thermal expansion (CLTE) of $\alpha=5.87\times10^{-4}$ m/m ° C.

TABLE 1

| Temperature (° C.) | Speed of Sound (m/s) | Wavelength (cm) @ 1 Khz | Change in (w) between it and the following (w) |
| --- | --- | --- | --- |
| 40° C. | 354.730 m/s | 35.473 cm | 0.057 cm |
| 39° C. | 354.163 m/s | 35.416 cm | 0.056 cm |
| 38° C. | 353.596 m/s | 35.360 cm | 0.059 cm |
| 37° C. | 353.027 m/s | 35.301 cm | 0.055 cm |
| 36° C. | 352.457 m/s | 35.246 cm | 0.057 cm |
| 35° C. | 351.887 m/s | 35.189 cm | 0.058 cm |
| 34° C. | 351.316 m/s | 35.131 cm | 0.057 cm |
| 33° C. | 350.743 m/s | 35.074 cm | 0.057 cm |
| 32° C. | 350.17 m/s | 35.017 cm | 0.057 cm |
| 31° C. | 349.596 m/s | 34.960 cm | 0.058 cm |
| 30° C. | 349.02 m/s | 34.902 cm | 0.058 cm |
| 29° C. | 348.444 m/s | 34.844 cm | 0.057 cm |
| 28° C. | 347.867 m/s | 34.787 cm | 0.058 cm |
| 27° C. | 347.289 m/s | 34.729 cm | 0.058 cm |
| 26° C. | 346.710 m/s | 34.671 cm | 0.058 cm |
| 25° C. | 346.13 m/s | 34.613 cm | 0.058 cm |
| 24° C. | 345.549 m/s | 34.555 cm | 0.058 cm |
| 23° C. | 344.967 m/s | 34.497 cm | 0.059 cm |
| 22° C. | 344.384 m/s | 34.438 cm | 0.058 cm |
| 21° C. | 343.801 m/s | 34.380 cm | 0.058 cm |
| 20° C. | 343.216 m/s | 34.322 cm | 0.059 cm |
| 19° C. | 342.63 m/s | 34.263 cm | 0.059 cm |
| 18° C. | 342.043 m/s | 34.204 cm | 0.058 cm |
| 17° C. | 341.455 m/s | 34.146 cm | 0.059 cm |
| 16° C. | 340.866 m/s | 34.087 cm | 0.059 cm |
| 15° C. | 340.276 m/s | 34.028 cm | 0.061 cm |
| 14° C. | 339.685 m/s | 33.967 cm | 0.058 cm |
| 13° C. | 339.093 m/s | 33.909 cm | 0.059 cm |
| 12° C. | 338.50 m/s | 33.850 cm | 0.059 cm |
| 11° C. | 337.906 m/s | 33.791 cm | 0.060 cm |
| 10° C. | 337.311 m/s | 33.731 cm | 0.059 cm |
| 9° C. | 336.715 m/s | 33.672 cm | 0.060 cm |
| 8° C. | 336.118 m/s | 33.612 cm | 0.060 cm |
| 7° C. | 335.519 m/s | 33.552 cm | 0.060 cm |
| 6° C. | 334.920 m/s | 33.492 cm | 0.060 cm |
| 5° C. | 334.319 m/s | 33.432 cm | 0.060 cm |
| 4° C. | 333.718 m/s | 33.372 cm | 0.060 cm |
| 3° C. | 333.115 m/s | 33.312 cm | 0.061 cm |
| 2° C. | 332.512 m/s | 33.251 cm | 0.060 cm |
| 1° C. | 331.907 m/s | 33.191 cm | 0.061 cm |
| 0° C. | 331.301 m/s | 33.130 cm | 0.061 cm |
| -1° C. | 330.694 m/s | 33.069 cm | 0.060 cm |
| -2° C. | 330.086 m/s | 33.009 cm | 0.061 cm |
| -3° C. | 329.477 m/s | 32.948 cm | Average: 0.0587 cm |

As stated above, the preferred CLTE is $\alpha=5.87\times10^{-4}$ m/m ° C. This can be further derived from the equation of linear expansion of materials, as shown in Equation 3 below:

$$\Delta L = \alpha \cdot L_o \cdot (T-T_o) \tag{3}$$

where:
ΔL is the increase in length;
α is the coefficient of linear expansion;
$L_o$ is the original length;
$T_o$ is the original temperature; and
T is the temperature to which it is heated.

Theoretical scaling laws for trailing edge noise have been established for some time. For example, the intensity of noise to low-speed air flow (>Mach 0.3) has the experimentally verified relation, as shown in Equation 4 below:

$$\langle p^2 \rangle \propto \frac{\rho_0^2}{c_0} \frac{U^5 L \delta}{r^2} D \tag{4}$$

where:
$p^2$ is the sound pressure intensity observed at a distance r from the trailing edge;
$\rho_o$ is the fluid density;
$c_0$ is the speed of sound;
U is the fluid velocity in the vicinity of the edge;
L is the span-wise extent of the flow (length of the blade section, for example);
δ is a measure of the boundary layer thickness at the edge; and
D is a directivity function that is a function of the angle of the observer to the edge.

As can be seen, scaling of noise intensity to the fifth power ($U^5$) highlights the role of aerodynamic noise as a design constraint for wind turbines. The local velocity over a blade section at radius R is U~ΩR, where Ω rotational speed of the rotor. This speed can be up to 320 km/h at the tip. Given the $U^5$ scaling relationship, a 15% increase in rotational speed would therefore increase noise by about 3 dB. Conversely, a 3 dB reduction in aerodynamic noise through design changes would allow for a 15% increase in turbine rotational speed. When coupled with blade structural design improvements, this increase in rotational speed can reduce system loads and enable lighter, cheaper rotor blades and drive trains.

The above-described configurations of structures for traversing a fluid environment may be applicable in combination with one or more of the configurations disclosed in co-pending PCT Patent Application No. PCT/CA2015/050740 to Ryan Church, filed on even date, entitled "STRUCTURE WITH RIGID WINGLET ADAPTED TO TRAVERSE A FLUID ENVIRONMENT," the contents of which are incorporated herein by reference, or in co-pending PCT Patent Application No. PCT/CA2015/050739 to Ryan Church, filed on even date, entitled "FLUID-REDIRECTING STRUCTURE," the contents of which are incorporated herein by reference.

Furthermore, the above-described configurations to the rotor blade of a horizontal-axis wind turbine can also be applied to vertical-axis wind turbines, and both of any scale. Such improvements may apply equally well to any arbitrary airfoil, not depending on the aerodynamic design thereof, mutatis mutandis, with such mutations as being relevant, including but not limited to, high altitude wind power (HAWP) devices, kite wind turbines, energy kites, urban wind turbines, airplane wings, gliders, drones and other things. The invention or inventions described herein may be applied to wind turbines having fewer or more blades than described by way of example in order to increase the operational efficiency and noise reduction capabilities of a wind turbine, to decrease vibration, loads, maintenance costs and mechanical wear, and to increase the scalability and marketability of such wind turbines.

As for urban wind turbines, such devices could all benefit from having both leading and trailing edge projections on their airfoils. For 'screw' type devices, (http://inhabitat.com/eddy-gt-wind-turbine-is-sleek-silent-and-designed-for-the-city/) they would be placed on both leading and trailing edges.

Some embodiments may have been described with reference to method type claims whereas other embodiments may have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment.

Other aspects may become apparent to the skilled reader upon review of the following.

Although embodiments have been described with reference to the drawings, those of skill in the art will appreciate that variations and modifications may be made without departing from the spirit and scope thereof as defined by the appended claims.

The above-described rotor blade configurations for a horizontal-axis wind turbine can also be applied to one or more rotor blades usable for vertical-axis wind turbines, and both of any scale, or to one or more rotor blades usable in hydroelectric dam turbines, gas turbines, tidal turbines or airborne wind energy turbines or in other kinds of turbines dealing with fluid flow whether of gas or of liquid.

The above-described rotor blade configurations may alternatively be employed in aircraft such as commercial airliners, military jet aircraft, helicopter blades, helicopter wings, civilian airplanes, drones, and other similar aircraft. The invention or inventions described herein may be applied to wind turbines having fewer or more blades than described by way of example in order to increase the operational efficiency of a wind turbine, to decrease maintenance costs, and to increase the scalability and marketability of such wind turbines.

It is observed that commercial airliners, civilian airplanes, drones, helicopter wings would have a winglet of similar size ratio to those of modern commercial airliners, with an architecture that bends back beyond the line of the trailing edge.

A structure as described herein may contain miniature projections that reduce impact forces of rain and snow, thus limiting erosion and blade failure.

Furthermore, a structure such as that described herein may be provided with a surface treatment such as a series of dimples and/or a series of hexagonal patterns and/or a series of troughs or grooves, all of which may either be sunk into the surface or raised above the surface of the winglet, such as is described in the above-mentioned co-pending PCT Application to Ryan Church entitled "STRUCTURE WITH RIGID WINGLET ADAPTED TO TRAVERSE A FLUID ENVIRONMENT."

Structures such as those described herein may apply equally well, mutatis mutandis, with such mutations as being relevant, including but not limited to, commercial airliners, military jet aircraft, helicopter blades, helicopter wings, civilian airplanes, spacecraft, drones, and other things.

Furthermore, the structures disclosed herein are usable in other fluid environments besides ambient air, such as water environments, oil environments and so forth.

The structure adapted to traverse a fluid environment may be applied to a vertical-axis wind turbine.

The structure adapted to traverse a fluid environment may be applied to a hydroelectric dam turbine.

The structure adapted to traverse a fluid environment may be applied to a gas turbines.

The structure adapted to traverse a fluid environment may be applied to a tidal turbines.

The structure adapted to traverse a fluid environment may be applied to an airborne airborne wind energy turbine.

The structure adapted to traverse a fluid environment may be applied to a commercial airliner.

The structure adapted to traverse a fluid environment may be applied to a military jet aircraft and to a spacecraft.

The structure adapted to traverse a fluid environment may be applied to a helicopter blade.

The structure adapted to traverse a fluid environment may be applied to helicopter wings.

The structure adapted to traverse a fluid environment may be applied to wings of civilian airplanes.

The structure adapted to traverse a fluid environment may be applied to wings of a drone.

Structure described herein may be formed by various methods, including using 3D printing for the projections, or manufacturing the projections is with pre-impregnated technology, pultrusion, automated fibre placement (AFP), and/or injection moulding.

It should be noted that the term 'comprising' does not exclude other elements or steps and the use of articles "a" or "an" does not exclude a plurality. Also, elements described in association with different embodiments may be combined. It should be noted that reference signs in the claims should not be construed as limiting the scope of the claims.

What is claimed is:

1. A structure adapted to traverse a fluid environment, the structure comprising:
    an elongate body having a root, a wingtip, a leading edge and a trailing edge; and
    a plurality of rigid projections each extending from a respective position along the trailing edge generally along the same plane as a front surface of the body wherein the projections include a first and a second set of projections extending from the trailing edge, each projection of the plurality of projections having a length, and
wherein the projections of the first set and the second set of projections are discrete projections that alternate with one another extending along the trailing edge;
wherein the lengths of adjacent projections extending from the trailing edge differ from one another; and
wherein the lengths of adjacent projections of the first set and the second set differ from one another at half a wavelength distance of a target sound frequency.

2. The structure of claim 1, where in the rigid projections extend towards the wingtip.

3. The structure of claim 2, wherein the rigid projections and the elongate body are connected to each other.

4. The structure of claim 1, wherein the projections extend from a portion of the leading edge that is less than the entire span of the leading edge.

5. The structure of claim 4, wherein the rigid projections extend from the leading edge from between about 40% and 96% of the elongate body, where the root of the rotor blade represents 0% and the wingtip represents 100%.

6. The structure of claim 1, wherein the projections of the first set and the projections of the second set interacting with incident air flow on the trailing edge to cause destructive interference of sound waves generated from the leading edge interacting with the incident air flow.

7. The structure of claim 1, wherein the structure is a rotor blade.

8. A turbine comprising at least one rotor blade as recited in claim 7.

9. The rotor blade of claim 1, wherein a different configuration of projections on the trailing edge is applied as opposed to the leading edge.

10. The rotor blade of claim 9, wherein the leading edge has projections of larger surface area as compared to the trailing edge.

11. A rotor blade, wherein the rotor blade defines an aerodynamic body having a pressure side, suction side, leading edge, trailing edge and blade tip, the blade body further comprising:
   a plurality of projections extending from the aerodynamic body in the vicinity of the trailing edge applied in the range of 40-96% of the rotor blade, where the root of the rotor blade represents 0% and the blade tip represents 100% the projections having an alternating length and width and being non-uniform in dispersement;
   a generally decreasing length and width respective to these projections moving towards the blade tip;
   a flexible or rigid and/or curvilinear or linear architecture;
   a composition of biologically or non-biologically based materials;
   wherein the length of each of the plurality of projections is approximately parallel to a local flow streamline defined for that projection;
   wherein the rigid projections that may be curvilinear are in the line of the arc of local flow streamline defined for that projection; and
   where it may be made of a material with a coefficient of linear thermal expansion (CLTE) between $1.0 \times 10^{-4}$ m/m ° C. and $7.0 \times 10^{4}$ m/m ° C.;
   wherein the projections of the first set and the second set of projections are discrete projections that alternate with one another extending along the trailing edge and the corresponding length of each projection of the projections is inversely correlated with a distance from the root;
   wherein the lengths of adjacent projections extending from the trailing edge differ from one another; and
   wherein the lengths of adjacent projections of the first set and the second set differ from one another at half a wavelength distance of a target sound frequency, the projections of the first set and the projections of the second set interacting with incident air flow on the trailing edge to cause destructive interference of sound waves generated from the leading edge interacting with the incident air flow.

12. The rotor blade of claim 11, wherein the projections are applied in the region of the trailing edge only.

13. The rotor blade of claim 11, wherein the projections are applied in the region of the leading edge only.

14. The rotor blade of claim 11, wherein the projection has a configuration selected from the group consisting of: a serration, brush, comb, riblet, fluting, fimbriae.

15. A wind turbine comprising a rotor blade as recited in claim 11.

16. A method for increasing the efficiency and/or decreasing the noise emissions of an operating wind turbine comprising a hub and rotor blade(s), wherein at least one rotor blade is connected to the hub and is defined by an aerodynamic body having a pressure side, suction side, leading edge, trailing edge and blade tip, the method comprising:
   mounting a plurality of projections on the aerodynamic body that extend in the vicinity of the trailing edge, the applied projections in the range of 40-96% of the rotor blade, where the root of the rotor blade represents 0% and the blade tip represents 100%;
   alternating the length and width respective to these projections;
   wherein the length of the longer projection is longer than an adjacent projection by ½ the wavelength of the sound wave at a given temperature;
   wherein the projections, as the projections travel through a fluid, create a sound wave of a certain wavelength that corresponds with a neighboring sound wave emitted by a component of the rotor blade that elicits destructive interference of the neighboring sound waves.

17. The method of claim 16, wherein the projections are made from a fibrous material that is embedded within a matrix.

* * * * *